United States Patent Office 3,468,939
Patented Sept. 23, 1969

3,468,939
4- AND 5-ARYL-1-NAPHTHALENEACETIC ACID COMPOUNDS
James S. Kaltenbronn, Ann Arbor, Mich., assignor to Parke Davis & Company, Detroit, Mich., a corporation of Michigan
No Drawing. Continuation-in-part of application Ser. No. 277,468, May 2, 1963. This application Apr. 28, 1965, Ser. No. 451,625
Claims priority, application Mexico, Apr. 29, 1964, 83,041
Int. Cl. C07c 63/52, 69/76, 101/02
U.S. Cl. 260—515        7 Claims

ABSTRACT OF THE DISCLOSURE 4-phenyl- and 5-phenyl-1-naphthaleneacetic acids optionally substituted on the phenyl ring; and α-alkyl derivatives, salts, alkyl esters, and dialkylaminoalkyl esters. The compounds have pharmacological activity and can be produced by (a) hydrolyzing a hydrolyzable group to carboxyl, (b) reacting a reactive metal derivative with carbon dioxide and acidifying the product, or (c) esterifying a carboxyl group or a reactive derivative.

---

This is a continuation-in-part of co-pending application Ser. No. 277,468, filed May 2, 1963, now abandoned.

This invention relates to 4- and 5-aryl-1-naphthaleneacetic acids and salts and esters thereof. More particularly, it relates to compounds of the formula

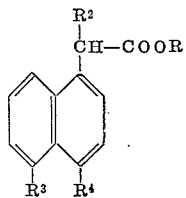

and to methods for their production; where R represents hydrogen, a salt-forming cation, a lower alkyl radical, or a lower dialkylaminoalkyl radical; $R^2$ represents hydrogen or a lower alkyl radical; one of $R^3$ and $R^4$ represents hydrogen; and the other of $R^3$ and $R^4$ represents

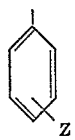

where Z represents hydrogen, fluorine, chlorine, bromine, o-methyl, m-methyl, o-methoxy, or m-methoxy. The lower dialkylaminoalkyl radical can be present in free base or acid-addition salt form.

In the foregoing formula the lower alkyl radicals are preferably those containing not more than four carbon atoms. The lower dialkylaminoalkyl radicals, which can be represented by the formula

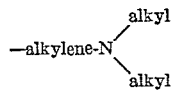

are preferably those in which each alkyl group contains not more than four carbon atoms, and the alklene group contains not more than four carbon atoms, separating the groups to which it is attached by at least two carbon atoms.

In accordance with the invention, compounds of the formula

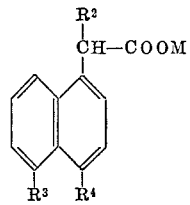

are produced by hydrolyzing a compound of the formula

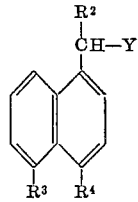

where M is hydrogen or a salt-forming cation, Y is a group hydrolyzable to a carboxyl group, and $R^2$, $R^3$, and $R^4$ are as defined before. Some examples of groups hydrolyzable to a carboxyl group are cyano, alkoxycarbonyl, aryloxycarbonyl, aralkoxycarbonyl, carbamoyl, alkyl-substituted carbamoyl, trihalomethyl, amidino, alkyl-substituted amidino, haloformyl,

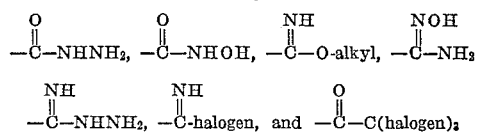

The precise nature of the group Y which is hydrolyzable to a carboxyl group is not critical because in carrying out the process it is converted to a carboxyl group. Therefore, if desired, the group Y can in appropriate cases contain one or more substituents such as lower alkyl, lower alkoxy, halogen, nitro, carboxy, or alkoxycarbonyl, and in those cases where the group Y is basic, it can also be employed in the form of an acid-addition salt. As used herein the term "group hydrolyzable to a carboxyl group" designates substituted as well as unsubstituted radicals. Compounds in which the group Y is the cyano group are preferred starting materials in the process because they are quite readily available and are hydrolyzable to the carboxyl derivatives in high yields.

The hydrolysis can be carried out under either acidic or alkaline conditions, by the use of an acidic or basic hydrolytic agent. Alkaline conditions are preferred and should be used exclusively with certain of the Y groups, for example, with the

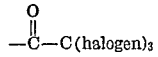

group. The hydrolysis can be carried out in water or in an aqueous solution of an unreactive, water-miscible, organic solvent such as an aliphatic alcohol, dioxane, tetrahydrofuran, ethylene glycol, propylene glycol or a lower alkyl ether of ethylene glycol or of diethylene glycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, strong organic acids such as p-toluenesulfonic acid, and acidic ion exchange resins. Preferred agents are alkali metal hydroxides such as sodium hydroxide or potassium hydroxide. The hydrolytic agent is normally employed in a considerable excess.

The hydrolysis is carried out by heating a solution or suspension of the starting material in a solvent medium containing an acid or a base until hydrolysis of the group Y is substantially complete. The required time and temperature naturally vary with the specific group Y and the basic or acidic agent used. However, in general, the reaction is carried out at a temperature between about 30–200° C., or at the reflux temperature of the solvent, with a reaction time of from 1–48 hours. When using one of the preferred basic hydrolytic agents the reaction is usually carried out at a temperature between 60–125° C., and is substantially complete within less than 24 hours. When the hydrolysis is carried out under alkaline conditions, the product is present in the reaction mixture in the form of a salt; and it can be isolated in this form or, following treatment with an acid, preferably a mineral acid, it can be isolated as the free acid. When the hydrolysis is carried out under acidic conditions, the product is present in the reaction mixture as the free acid and it can be isolated directly in this form or, by subsequent treatment with a base, it can be isolated in salt form.

Starting materials required for use in the foregoing process can be prepared by a variety of methods as illustrated in greater detail hereinafter. For example, 4-aryl-1-naphthylacetonitriles can be prepared by reacting a 1-aryl-naphthalene with paraformaldehyde and hydrochloric acid to produce a 4-aryl-1-chloromethylnaphthalene which is then reacted with sodium cyanide in aqueous medium to produce the corresponding 4-aryl-1-naphthylacetonitrile. Alternatively, a 4- or 5-aryl-1-methylnaphthalene is reacted with N-bromosuccinimide to produce a 4- or 5-aryl-1-bromomethylnaphthalene, and the latter compound is converted by reaction with sodium cyanide in an aqueous medium to a 4- or 5-aryl-1-naphthylacetonitrile.

Also in accordance with the invention, compounds of the formula

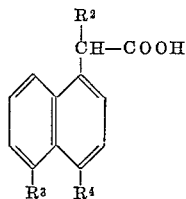

are produced by reacting a 4- or 5-aryl-1-alkylnaphthalene reactive metal derivative which can be represented by the formula

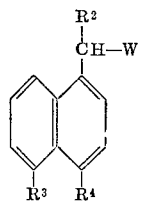

with carbon dioxide in an anhydrous medium followed by acidifying the product; where W represents a reactive metal substituent such as magnesium halide (-Mg-halogen) or lithium and $R^2$, $R^3$, and $R^4$ are as defined before. The first step of this process is carried out in an anhydrous, non-hydroxylic solvent such as a lower alkyl ether, a lower alkyl ether of a glycol, tetrahydrofuran, an aliphatic or aromatic hydrocarbon, or mixtures of the foregoing. The preferred reactive metal derivative is a magnesium halide derivative which is customarily prepared in situ by reacting a 4- or 5-aryl-1-haloalkylnaphthalene with magnesium, but if desired it can be prepared separately and added to the reaction mixture as such. Approximately the calculated amount of magnesium is employed; an excess is avoided especially in those cases in which another halogen atom is present on the phenyl ring. Other reactive metal derivatives can be prepared by procedures which are generally analogous; for example, the lithium derivative can be obtained by reacting a 4- or 5-aryl-1-methoxymethylnaphthalene with lithium or a lithium alkyl in a mixture of tetrahydrofuran and ether. The reaction with carbon dioxide is carried out by adding at least the calculated amount and preferably a considerable excess of carbon dioxide to the reaction medium in which the reactive metal derivative is present. The carbon dioxide can be added to the reaction mixture in either gaseous or solid form. Heating is not necessary, and when the reaction with carbon dioxide is carried out at about 25° C. or below, it is usually substantially complete within less than ten minutes. The 4- or 5-aryl-1-naphthaleneacetic acid compound is then isolated following acidification of the reaction mixture, preferably using a mineral acid such as dilute hydrochloric acid or dilute sulfuric acid.

Further in accordance with the invention, compounds of the formula

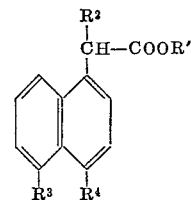

are produced by reacting a compound of the formula

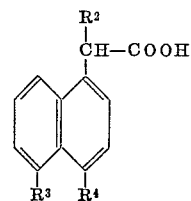

or a reactive derivative thereof with a lower alkanol, a lower dialkylaminoalkanol or a reactive derivative thereof; where R′ is lower alkyl or lower dialkylaminoalkyl and $R^2$, $R^3$, and $R^4$ are as defined before. The lower alkanol, lower dialkylaminoalkanol, and their reactive derivatives serve as esterifying agents. Some examples of suitable reactive derivatives of the acid are the acid anhydride, acid halides, and alkali metal salts of the acid. Some examples of suitable reactive derivatives of the alcohol are various esters such as methyl bromide, methyl iodide, ethyl iodide, propyl iodide, dimethyl sulfate, diethyl sulfate, 2-dimethylaminoethyl chloride, 2-diethylaminoethyl chloride, 2-dipropylaminoethyl chloride, and 3-diethylaminopropyl bromide. Other reactive derivatives such as diazomethane can also be used.

When the esterifying agent is a lower alkanol or a lower dialkylaminoalkanol, the process is preferably carried out by heating the free acid or the anhydride or halide with an excess of the lower alkanol or lower dialkylaminoalkanol. An acidic catalyst such as hydrogen chloride, sulfuric acid, or benzene sulfonic acid is used when the free acid or the anhydride is one of the reactants. Additional solvents such as tetrahydrofuran, benzene, dioxane or diethylene glycol dimethyl ether may be present but are not necessary. The reaction is commonly carried out at a temperature of about 25° C. or higher, preferably at 60–150° C. but not higher than the reflux temperature, and is normally completed within 5 to 100 hours with the free acid or within 1 to 5 hours with the anhydride or a halide.

When the esterifying agent is an ester of a lower alkanol or an ester of a lower dialkylaminoalkanol as illustrated above, the process is preferably carried out by heating the acid or salt thereof with the selected halide, sulfate, or other ester derivative in a solvent in the presence of a base. Some examples of suitable solvents are lower alkanols, tetrahydrofuran, dioxane, dimethylformamide, diethylene glycol dimethyl ether, and mixtures thereof. Some examples of suitable bases are inorganic alkalies and tertiary organic amines. At least one equivalent and preferably an excess of the esterifying agent is used. The reaction is usually carried out at a temperature from 25–150° C., preferably from 50–100° C., and under these conditions it is substantially complete with 24 hours.

When the esterifying agent is diazomethane, the process is preferably carried out in an unreactive solvent such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under which conditions the esterification is complete within less than 5 minutes.

In the case of the production of the lower dialkylaminoalkyl esters of the invention, the product can be isolated, by pH adjustment, either as the free base or as an acid-addition salt.

The free acids and the free bases of the invention form salts with a variety of organic or inorganic bases or acids. Some examples of suitable bases are sodium hydroxide, potassium hydroxide, calcium hydroxide, sodium carbonate, potassium bicarbonate, choline, 2-hydroxyethylamine, ammonia, and diethylamine. Some examples of suitable acids are hydrochloric acid, hydrobromic acid, sulfuric acid, phosphoric acid, acetic acid, citric acid, tartaric acid and sulfamic aid. The preferred carboxylate salts of the invention are the pharmaceutically-acceptable salts of an alkali metal, an alkaline earth metal, ammonia, or a substituted ammonia. Preferred acid-addition salts of the invention are the mineral acid salts. The carboxylate salts and acid-addition salts with pharmaceutically-acceptable cations and anions differ in solubility properties from the free acids and free bases but are otherwise equivalent for the purposes of the invention.

The compounds of the invention are new chemical compounds useful as pharmacological agents and as chemical intermediates. They are anti-inflammatory agents and can be used in the relief of inflammatory conditions as well as in the prevention or suppression of the occurrence of inflammation. They are preferably administered by the oral route although parenteral administration can also be used. With respect to anti-inflammatory activity, the preferred compounds of the invention are 4-phenyl-1-naphthaleneacetic acid and 5-phenyl-1-naphthaleneacetic acid, which have a much higher order of anti-inflammatory activity than is normally found in non-steroids. Other preferred anti-inflammatory agents of the invention are the ortho- and meta-halo compounds. Some of the compounds of the inventin also exhibit other useful pharmacological properties. For example, 4-phenyl-1-naphthaleneacetic acid and 5-phenyl-1-naphthaleneacetic acid antagonize the action of bradykinin and are of value as anti-allergic agents. The compounds of the invention can be employed in either free acid, ether, or salt form and can be combined with either a solid or liquid carrier or diluent and made available in varying amounts in such pharmaceutical forms as tablets, capsules, powders, and aqueous and non-aqueous suspensions and solutions.

The invention is illustrated by the following examples.

Example 1

A solution of 12 g. of potassium hydroxide in 30 ml. of water is added to a solution of 5.7 g. of 4-phenyl-1-naphthylacetonitrile in 80 ml. of ethanol and the mixture is heated at reflux for 16 hours, concentrated to a small volume under reduced pressure, diluted with water, and washed twice with ether. The aqueous phase is acidified with dilute hydrochloric acid and the insoluble 4-phenyl-1-naphthaleneacetic acid is collected on a filter; M.P. 120.5–121.5° C. following crystallization from benzene-hexane.

One gram of sodium carbonate is added in portions to a solution of 5.0 g. of 4-phenyl-1-naphthaleneacetic acid in 50 ml. of methanol. The mixture is heated at reflux for 30 minutes and then evaporated to dryness under reduced pressure to give 4-phenyl-1-naphthaleneacetic acid sodium salt as a white powder.

A solution of 2.4 g. of choline chloride in 10 ml. of methanol is added to a solution of 5.0 g. of 4-phenyl-1-naphthaleneacetic acid sodium salt in 50 ml. of methanol. After one hour the insoluble sodium chloride is removed by filtration and the filtrate is evaporated to dryness under reduced pressure to give 4-phenyl-1-naphthaleneacetic acid choline salt as a white solid.

A solution of 0.33 g. of ammonia in 10 ml. of methanol is added to a solution of 5.0 g. of 4-phenyl-1-naphthaleneacetic acid in 50 ml. of methanol and the mixture is evaporated to dryness to give 4-phenyl-1-naphthaleneacetic acid ammonium salt as a white solid. The diethylamine salt is prepared similarly by substituting 1.4 g. of diethylamine for the ammonia.

The starting material can be obtained as follows. A mixture of 100 g. of 1-phenylnaphthalene, 27 g. of paraformaldehyde, 100 ml. of acetic acid, 112 ml. of concentrated hydrochloric acid and 54 ml. of phosphoric acid is heated with stirring for 12 hours at 88–91° C., an additional 30 ml. of concentrated hydrochloric acid being added in portions at intervals during the heating period. The mixture is allowed to stand at room temperature for 16 hours and poured into water. The water is removed by decantation and the residue is dissolved in chloroform. The chloroform solution is washed with water, with saturated sodium bicarbonate solution, and with several additional portions of water, dried, and evaporated under reduced pressure to give a residue of 4-phenyl-1-chloromethylnaphthalene, B.P. 141–160° C. at 0.25 mm., M.P. 62–64° C. following crystallization of the distillate from hexane. A solution of 25.2 g. of this product in 150 ml. of acetone and 100 ml. of ethanol is treated with 4.9 g. of sodium cyanide in 30 ml. of water and heated at reflux for 5 hours. The solvent is removed under reduced pressure and the residue is stirred with water and chloroform. The chloroform solution is separated, washed with water, dried and evaporated under reduced pressure to give 4-phenyl-1-naphthylacetonitrile; M.P. 102–103° C. following crystallization from benzene-hexane.

Example 2

A solution of 30 g. of potassium hydroxide in 75 ml. of water is added to a solution of 27.2 g. of 4-(m-methylphenyl)-1-naphthylacetonitrile in 200 ml. of ethanol. The mixture is heated at reflux for 16 hours and then distilled to a small volume under reduced pressure. The remaining mixture is diluted with water and washed twice with ether. The aqueous phase is separated and acidified with dilute hydrochloric acid. The insoluble 4-(m-methylphenyl)-1-naphthylacetic acid which separates is collected; M.P. 124–125.5° C. following several crystallizations from benzene-hexane and from aqueous ethanol.

By the foregoing procedure, with the substitution of 27.2 g. of 4-(o-methylphenyl)-1-naphthylacetonitrile for the 4-(m-methylphenyl)-1-naphthylacetonitrile, the product obtained is 4-(o-methylphenyl)-1-naphthaleneacetic acid.

The starting materials are obtained from 1-(m-methylphenyl)naphthalene and from 1-(o-methylphenyl)naphthalene by the general procedure illustrated in Example 1.

Example 3

A solution of 20 g. of potassium hydroxide in 50 ml. of water is added to a solution of 22.7 g. of 4-(m-chlorophenyl)-1-naphthylacetonitrile in 150 ml. of ethanol and 100 ml. of dioxane. The resulting mixture which contains two phases is heated at reflux with stirring for 18 hours and distilled to a small volume under reduced pressure. The remaining mixture is partitioned between water and ether and the aqueous phase is separated, acidified with dilute hydrochloric acid and extracted twice with ether. The combined ether extract is washed with water, dried, and evaporated under reduced pressure to give a residue of 4-(m-chlorophenyl)-1-naphthaleneacetic acid; M.P. 143–145° C. following crystallizations from cyclohexane and from aqueous ethanol.

The starting material is obtained from 1-(m-chlorophenyl)naphthalene by the general procedure illustrated in Example 1. The 1-(m-chlorophenyl)naphthalene is obtained by reacting the monomagnesium derivative of 3-chlorobromobenzene with 1-oxo-1,2,3,4-tetrahydronaphthalene in ether, hydrolyzing the reaction mixture with dilute hydrochloric acid, heating the product with 20% sulfuric acid to give 4-(m-chlorophenyl)-1,2-dihydronaphthalene, and dehydrogenating the latter substance by heating it with sulfur at 215° C. for 30 minutes.

Example 4

A solution of 10 g. of potassium hydroxide in 25 ml. of water is added to a solution of 10 g. of 4-(o-chlorophenyl)-1-naphthylacetonitrile in 100 ml. of ethanol and the mixture is heated at reflux for 18 hours, distilled to a small volume under reduced pressure, diluted with water and washed twice with ether. The aqueous phase is separated and acidified with dilute hydrochloric acid and the insoluble product, 4-(o-chlorophenyl)-1-naphthaleneacetic acid, is collected; after several crystallizations from benzene-hexane it partially melts at 171° C., resolidifies and remelts at 184.5–186° C.

The starting material can be obtained as follows. Ten grams of magnesium is reacted with 80 g. of o-chlorobromobenzene and a crystal of iodine in 125 ml. of ether. 64 g. of 1-oxo-4-methyl-1,2,3,4-tetrahydronaphthalene in 100 ml. of ether is added and the mixture is heated at reflux for one hour and hydrolyzed with water and dilute hydrochloric acid. The product recovered from the ether solution is warmed at 80° C. with 250 ml. of 20% sulfuric acid for 30 minutes to give 4-(o-chlorophenyl)-1-methyl-1,2-dihydronaphthalene. This product is converted to 4-(o-chlorophenyl) - 1 - methylnaphthalene by heating it with an equimolar amount of sulfur at 215–220° C. for 30 minutes. Following distillation in vacuo, chromatography on alumina, and crystallization from hexane, the product melts at 72–73.5° C. A solution of 10 g. of this product in 100 ml. of carbon tetrachloride is treated with 7.05 g. of freshly crystallized N-bromosuccinimide and 200 mg. of dibenzoyl peroxide. While irradiating it with a floodlight, the mixture is heated at reflux for 18 hours and then filtered, extracted with two portions of 5% sodium hydroxide and with several portions of water, dried, and evaporated under reduced pressure to give 4-(o-chlorophenyl) - 1 - bromomethylnaphthalene; M.P. 122.5–123.5° C. after crystallization from benzene-hexane. A solution of 13 g. of this product in 50 ml. of acetone and 50 ml. of ethanol is treated with 2.06 g. of sodium cyanide in 10 ml. of water. The mixture is heated at reflux for 18 hours, distilled to a small volume under reduced pressure, diluted with water and extracted with ether. The ether solution is dried and evaporated to give 4-(o-chlorophenyl) - 1 - naphthylacetonitrile, suitable for use without further purification.

Example 5

A solution of 50 g. of potassium hydroxide in 75 ml. of water is added to a solution of 40.9 g. of 4-(m-bromophenyl)-1-naphthylacetonitrile in 300 ml. of ethanol and 100 ml. of dioxane. The mixture is heated at reflux for 18 hours, concentrated to a small volume under reduced pressure, diluted with water and washed twice with ether. The aqueous phase is separated and acidified with dilute hydrochloric acid. The insoluble 4-(m-bromophenyl)-1-naphthaleneacetic acid is collected; M.P. 162.5–163.5° C. after several crystallizations from benzene-hexane.

The starting material is obtained from m-dibromobenzene by the general procedure illustrated in Example 4.

Example 6

A solution of 30 g. of potassium hydroxide in 75 ml. of water is added to a solution of 22.4 g. of 4-(m-fluorophenyl)-1-naphthylacetonitrile in 200 ml. of ethanol. The mixture is heated at reflux for 18 hours, distilled to a small volume under reduced pressure, diluted with water, and washed twice with ether. The aqueous phase is separated and acidified with dilute hydrochloric acid to give a precipitate of 4-(m-fluorophenyl)-1-naphthaleneacetic acid; M.P. 145.5–146.5° C. after several crystallizations from benzenehexane.

The starting material is obtained from 3-bromofluorobenzene by the general procedure illustrated in Example 4.

Example 7

A solution of 30 g. of potassium hydroxide in 75 ml. of water is added to a solution of 18 g. of 4-(p-fluorophenyl)-1-naphthylacetonitrile in 200 ml. of ethanol. Sufficient dioxane, about 75 ml., is added to make a homogeneous solution which is then heated at reflux for 18 hours, concentrated to a small volume under reduced pressure, diluted with water and washed twice with ether. The aqueous phase is separated and acidified with dilute hydrochloric acid. The insoluble 4-(p-fluorophenyl)-1-naphthaleneacetic acid which separates is collected; M.P. 162–163.5° C. following two crystallizations from benzene-hexane.

The starting material is obtained from 4-bromofluorobenzene by the general procedure illustrated in Example 4.

Example 8

A solution of 30 g. of potassium hydroxide in 75 ml. of water is added to a solution of 24.3 g. of 4-(m-methoxyphenyl)-1-naphthylacetonitrile in 200 ml. of ethanol and 50 ml. of dioxane. The solution is heated at reflux for 4 hours, concentrated to a small volume under reduced pressure, diluted with water and washed twice with ether. The aqueous phase is separated and acidified with dilute hydrochloric acid. The insoluble oily product is extracted with ether and the ether extract is washed with water, dried, and evaporated under reduced pressure to recover the 4-(m-methoxyphenyl)-1-naphthalenacetic acid; M.P. 116.5–118.5° C. following several crystallizations from benzenehexane.

By the foregoing procedure, with the substitution of 24.3 g. of 4-(o-methoxyphenyl)-1-naphthylacetonitrile for the 4-(m-methoxyphenyl) - 1 - naphthylacetonitrile, the product obtained is 4-(o-methoxyphenyl)-1-naphthaleneacetic acid.

The starting materials are obtained from m-bromoanisole and from o-bromoanisole by the general procedure illustrated in Example 4.

Example 9

A solution of 11 g. of potassium hydroxide in 35 ml. of water is added to a resolution of 11.1 g. of 5-(m-fluorophenyl)-1-naphthylacetonitrile in 110 ml. of ethanol. The mixture is heated at reflux for 12 hours and then distilled to a small volume under reduced pressure. The remaining mixture is diluted with water and washed twice with ether. The aqueous phase is separated and acidified with dilute hydrochloric acid and the insoluble product which separates is extracted with ether. The ether extract is washed with water, dried, and evaporated to give a residue of 5-(m-fluorophenyl) - 1 - naphthaleneacetic acid; M.P. 127.5–129° C. following several crystallizations from cyclohexane.

The starting material is obtained from 3-bromofluorobenzene and 1-oxo-5-methyl-1,2,3,4-tetrahydronaphthalene by the general procedure illustrated in Example 4.

Example 10

A solution of 7.6 g. of potassium hydroxide in 20 ml. of water is added to a solution of 7.6 g. of 5-(o-chloropenyl)-1-naphthylacetonitrile in 75 ml. of ethanol. The mixture is heated at reflux for 12 hours and then distilled to a small volume under reduced pressure. The remaining mixture is diluted with water and washed twice with ether. The aqueous phase is separated and acidified with dilute hydrochloric acid. The insoluble product which separates is extracted with ether-ethyl acetate and the organic solution is washed with water, dried, and evaporated to give a residue of 5-(o-chlorophenyl)-1-naphthaleneacetic acid; M.P. 203–205° C. following several crystallizations from acetonitrile.

The starting material is obtained from o-chlorobromobenzene and 1-oxo-5-methyl-1,2,3,4-tetrahydronaphthalene by the general procedure illustrated in Example 4.

Example 11

A solution of 12.4 g. of potassium hydroxide in 40 ml. of water is added to a solution of 12.4 g. of 5-phenyl-1-naphthylacetonitrile in 125 ml. of ethanol, and the mixture is heated at reflux for 12 hours, concentrated to a small volume under reduced pressure, diluted with water, and washed twice with ether. The aqueous phase is acidified with dilute hydrochloric acid and the insoluble product which separates is extracted with ether. The ether extract is washed with water, dried, and evaporated to give a residue of 5-phenyl-1-naphthaleneacetic acid; M.P. 180–182° C. following several crystallization from benzene-hexane.

The starting material can be obtained as follows. A mixture prepared by adding 10.5 g. of recrystallized N-bromosuccinimide and 100 mg. of dibenzoyl peroxide to 12.6 g. of 5-phenyl-1-methylnaphthalene in 125 ml. of carbon tetrachloride is heated at reflux for 2 hours, with irradiation from a floodlight. The mixture is filtered and the filtrate is washed with 5% sodium hydroxide and with several portions of water, dried, and evaporated to give a residue of 5-phenyl-1-bromomethylnaphthalene. A solution of 15.9 g. of this product in 75 ml. of ethanol and 75 ml. of acetone is treated with 2.7 g. of sodium cyanide in 15 ml. of water. The resulting solution is heated at reflux for five hours, distilled to a small volume under reduced pressure and diluted with ether. The ether solution is washed with water, dried, and evaporated to give 5-phenyl-1-naphthylacetonitrile, suitable for use without further purification.

Example 12

A mixture of 12 g. of the methyl ester of α-methyl-4-phenyl-1-naphthaleneacetic acid, 12.5 g. of potassium hydroxide and 125 ml. of ethanol is heated at reflux for 20 hours and allowed to stand at room temperature for two days. The ethanol is removed by distillation and the residue is stirred with 100 ml. of water and washed with ether. The aqueous solution is acidified with dilute hydrochloric acid and the insoluble α-methyl-4-phenyl-1-naphthalene-acetic acid is collected on a filter; M.P. 125–126.5° C. following crystallization from aqueous acetic acid.

The starting material can be obtained as follows. A solution of 13 g. of 4-phenyl-1-naphthalene-acetic acid, 150 ml. of methanol and 3 ml. of concentrated sulfuric acid is heated under reflux for 17 hours, concentrated to a small volume by distillation of the solvent and diluted with 250 ml. of water. The aqueous mixture is extracted with several portions of ether and the ether extract is washed with water, with dilute sodium bicarbonate solution, with water, and is then dried and evaporated to give a residue of the methyl ester of 4-phenyl-1-naphthaleneacetic acid. This product (about 13 g.) is dissolved in 16 ml. of dimethyl sulfoxide and the solution added dropwise with stirring and cooling to a mixture of 2.6 g. of a 53.4% suspension of sodium hydride in mineral oil and 9 ml. of dimethyl sulfoxide. The reaction is conducted under anhydrous conditions in a nitrogen atmosphere with the temperature maintained between 15–35° C. The red reaction mixture is stirred at room temperature for one hour or until the evolution of hydrogen has ceased. With continued stirring and cooling to maintain the temperature below 35° C., 8.3 g. of methyl iodide is slowly added and the resulting thick slurry stirred at room temperature for 18 hours. Excess sodium hydride is then decomposed by the cautious addition of a solution of 1.5 ml. of acetic acid in 10 ml. of benzene. 100 ml. of water is slowly added and the mixture is extracted with several portions of ether. The ether extract is dried and evaporated to give a residue of the methyl ester of α-methyl-4-phenyl-1-naphthaleneacetic acid, suitable for use without further purification.

Example 13

A mixture of 10 g. of the ethyl ester of 4-phenyl-1-naphthaleneacetic acid, 10 g. of potassium hydroxide, 25 ml. of water and 100 ml. of ethanol is heated at reflux for four hours and distilled to a small volume under reduced pressure. The residue is diluted with water and washed twice with ether. The aqueous solution is acidified with dilute hydrochloric acid and the 4-phenyl-1-naphthaleneacetic acid which separates is collected on a filter; M.P. 120.5–121.5° C. following crystalliaztion from benzene-hexane.

The same product is obtained by the substitution of the ethyl ester of 4-phenyl-1-naphthaleneacetimidic acid hydrobromide in the foregoing procedure.

The starting mterials can be obtained as follows. A solution of 10 g. of 4-phenyl-1-naphthylacetonitrile in 100 ml. of ether containing 1.9 g. of ethanol is cooled to −15° C. as gaseous hydrogen bromide is introduced until the desired iminoether hydrobromide (ethyl ester of 4-phenyl-1-naphthaleneacetimidic acid hydrobromide) precipitates. The crude product is collected on a filter. A solution of 5 g. of the iminoether hydrobromide is dissolved in 25 ml. of cold water and allowed to stand for several minutes. The oil which separates is extracted with benzene and the benzene extract is washed with saturated sodium bicarbonate solution, with three portions of water, dried and evaporated under reduced pressure to give the ethyl ester of 4-phenyl-1-naphthaleneacetic acid, suitable for use without further purification.

Example 14

A mixture of 10 g. of 4-phenyl-1-naphthalene-acetamide, 8 g. of sodium hydroxide, 30 ml. of water and 120 ml. of ethanol is heated at reflux for five hours, concentrated to a small volume by distillation under reduced pressure, diluted with water and washed with ether. The aqueous solution is separated and acidified with dilute hydrochloric acid and the insoluble 4-phenyl-1-naphthaleneacetic acid which precipitates is collected on a filter; M.P. 120.5–121.5° C. following crystallization from benzene-hexane.

The same product is obtained by the substitution of the hydrazide of 4-phenyl-1-naphthalene-acetic acid in the foregoing procedure.

The starting materials can be obtained as follows. A solution of 5 g. of the ethyl ester of 4-phenyl-1-naphthaleneacetimidic acid hydrobromide in 50 ml. of acetone is heated at reflux for 30 minutes and then evaporated under reduced pressure to give 4-phenyl-1-naphthaleneacetamide.

A mixture of 10 g. of the ethyl ester of 4-phenyl-1-naphthaleneacetic acid, 8.1 g. of 85% hydrazine hydrate and 40 ml. of ethanol is heated at reflux for four hours and cooled. The insoluble product, the hydrazide of 4-phenyl-1-naphthaleneacetic acid, is collected on a filter.

Example 15

A solution of 10 g. of 4-phenyl-1-naphthaleneacetamide, 100 ml. of the dimethyl ether of diethylene glycol and 50 ml. of concentrated hydrochloric acid is heated at 100° C. for ten hours and diluted with water. The insoluble product is collected on a filter and extracted with sodium bicarbonate solution. The sodium bicarbonate solution is filtered and the filtrate is acidified with dilute hydrochloric acid to give a precipitate of 4-phenyl-1-naphthaleneacetic acid; M.P. 120.5–121.5° C. following crystallization from benzene-hexane.

The same product is obtained by the substitution of the hydrazide or methyl or ethyl ester of 4-phenyl-1-naphthaleneacetic acid in the foregoing procedure.

Example 16

A mixture of 10 g. of 4-phenyl-1-naphthaleneacetamidine, 10 g. of potassium hydroxide, 30 ml. of water, and 125 ml. of ethanol is heated at reflux for four hours, concentrated to a small volume by distillation under reduced pressure, diluted with water, and washed twice with ether. The aqueous solution is separate and acidified with dilute sulfuric acid. The insoluble 4-phenyl-1-naphthaleneacetic acid which separates is collected on a filter; M.P. 120.5–121.5° C. following crystallization from benzene-hexane.

The starting material can be obtained as follows. A solution of 28.9 g. of the ethyl ester of 4-phenyl-1-naphthaleneacetimidic acid in 100 ml. of 75% ethanol containing 5.35 g. of ammonium chloride is heated at 70° C. for four hours and diluted with acetone to precipitate ammonium chloride. The ammonium chloride is removed by filtration and the filtrate is diluted with a further quantity of acetone an refrigerated at 0° C. for several hours. The insoluble 4-phenyl-1-naphthaleneacetamidine hydrochloride which separates is collected on a filter. The free base is obtained by neutralization.

Example 17

A solution of 12.6 g. of 4-phenyl-1-chloromethylnaphthalene in 50 ml. of ether is added in portions with stirring to 1.2 g. of magnesium in 20 ml. of ether, the rate of addition being regulated to maintain the reaction mixture at reflux. The mixture, containing 4-phenyl-1-naphthylmethylmagnesium chloride, is stirred at room temperature for one hour after the addition is complete and an excess of crushed solid carbon dioxide is then added. The mixture is allowed to stand for several minutes and then hydrolyzed by the addition of dilute hydrochloric acid with stirring. The ether phase is separated, washed with water, dried and evaporated under reduced pressure to give a residue of 4-phenyl-1-naphthaleneacetic acid; M.P. 120.5–121.5° C. following crystallization from benzenehexane.

By the foregoing procedure, with substitution of 13.3 g. of 4-(m-methylphenyl)-1-chloromethylnaphthalene for the 4-phenyl-1-chloromethylnaphthalene, the product obtained is 4-(m-metylphenyl)-1-naphthaleneacetic acid; M.P. 124–125.5° C. following several crystallizations from benzene-hexane and from aqueous ethanol.

By the foregoing procedure, with the substitution of 14.3 g. of 4-(m-chlorophenyl)-1-chloromethylnaphthalene for the 4-phenyl-1-chloromethylnaphthalene, the product obtained is 4-(m-chlorophenyl)-1-naphthaleneacetic acid; M.P. 143–145° C. following crystallizations from cyclohexane and from aqueous ethanol.

One gram of sodium carbonate is added in portions to a solution of 5.0 g. of 4-phenyl-1-naphthaleneacetic acid in 50 ml. of methanol. The mixture is heated at reflux for 30 minutes and then evaporated to dryness under reduced pressure to give 4-phenyl-1-naphthaleneacetic acid sodium salt as a white powder.

The starting materials can be obtained as follows. 4-phenyl-1-chloromethylnaphthalene, M.P. 62–64° C., is obtained by heating 1-phenylnaphthalene, paraformaldehyde, and concentrated hydrochloric acid in a mixture of acetic acid and phosphoric acid. 4-(m-methylphenyl)-1-chloromethylnaphthalene, B.P. 160–185° C. at 0.5–0.8 mm., is obtained by heating 1-(m-methylphenyl)naphthalene, paraformaldehyde, and concentrated hydrochloric acid in a mixture of acetic acid and phosphoric acid. 4-(m-chlorophenyl)-1-chloromethylnaphthalene, B.P. 130–170° C. at 0.15–0.6 mm., is obtained by preparing the mono magnesium derivative of 3-chlorobromobenzene, reacting it with 1-oxo-1,2,3,4-tetrahydronaphthalene in ether, hydrolyzing the product with dilute hydrochloric acid, heating it with 20 percent sulfuric acid to cause dehydration, converting the resulting 4-(m-chlorophenyl)-1,2-dihydronaphthalene to 1-(m-chlorophenyl)naphthalene by heating it with sulfur, and then heating the product with paraformaldehyde and concentrated hydrochloric acid in a mixture of acetic acid and phosphoric acid.

Example 18

A solution of 1.8 g. of 4-phenyl-1-naphthaleneacetic acid in 100 ml. of methanol containing 10 ml. of concentrated hydrochloric acid is heated at reflux for 18 hours. The solvent is removed by distillation under reduced pressure and the residue is dissolved in ether. The ether solution is washed with saturated sodium bicarbonate solution and with several portions of water, dried and evaporated under reduced pressure to give the methyl ester of 4-phenyl-1-naphthaleneacetic acid. For purification, it can be distilled in vacuo. The product is collected at a bath temperature of 165–175° C. at 0.1 mm.

By the foregoing procedure, with the substitution of 4-(m-methylphenyl)-1-naphthaleneacetic acid for the 4-phenyl-1-naphthaleneacetic acid, the product obtained is the methyl ester of 4-(m-methylphenyl)-1-naphthaleneacetic acid.

Example 19

A stirred suspension of 1.8 g. of 4-phenyl-1-naphthaleneacetic acid, 75 ml. of methanol, 1.0 g. of potassium carbonate and 5 ml. of methyl iodide is heated at reflux for two hours, cooled to room temperature, and stirred with an additional 7 ml. of methyl iodide for one hour. The mixture is poured into water and extracted with ether. The ether solution is washed with sodium bicarbonate solution and with several portions of water, dried over sodium sulfate, and evaporated under reduced pressure to give a residue of the methyl ester of 4-phenyl-1-naphthaleneacetic acid; it distills at a bath temperature of 165–175° C. at 0.1 mm.

The same product is obtained by adding an ethereal solution of diazomethane to a solution of 4-phenyl-1-naphthaleneacetic acid in ether at 15° C.

Example 20

With stirring, 10 g. of the acid chloride of 4-phenyl-1-naphthaleneacetic acid is added slowly to 80 ml. of methanol. The reaction mixture is cautiously heated to the boiling point, maintained at reflux for one hour, and then evaporated under reduced pressure to give a residue of the methyl ester of 4-phenyl-1-naphthaleneacetic acid; it distills at a bath temperature of 165–175° C. at 0.1 mm.

By the foregoing procedure, with the substitution of 600 ml. of n-propanol for the methanol, the product obtained is the n-propyl ester of 4-phenyl-1-naphthaleneacetic acid.

The starting material is obtained as follows. 25 g. of 4-phenyl-1-naphthaleneacetic acid is added with stirring to 100 ml. of thionyl chloride. When the addition is complete, the mixture is cautiously heated to the boiling point and then maintained at reflux for five hours. The excess thionyl chloride is removed by distillation under reduced pressure to yield the acid chloride of 4-phenyl-1-naphthaleneacetic acid, suitable for use without further purification.

Example 21

A solution of 2.0 g. of 4-phenyl-1-naphthaleneacetic acid in 100 ml. of ethanol containing 10 ml. of concentrated hydrochloric acid is heated at reflux for 18 hours. The solvent is removed by distillation under reduced pressure and the residue is dissolved in ether. The ether solution is washed with saturated sodium bicarbonate solution and with several portions of water, dried and evaporated under reduced pressure to give a residue of the ethyl ester of 4-phenyl-1-naphthaleneacetic acid; it distills at a bath temperature of 175–185° C. at 0.1 mm.

Example 22

A mixture of 12 g. of the anhydride of 4-phenyl-1-naphthaleneacetic acid, 75 ml. of ethanol and 0.1 g. of concentrated sulfuric acid is heated at reflux for five hours and then evapoarted under reduced pressure. The residue is extracted with ether and the ether extract is washed with dilute sodium bicarbonate solution and with water, dried and evaporated under reduced pressure to give the ethyl ester of 4-phenyl-1-naphthaleneacetic acid; it distills at a bath temperature of 175–185° C. at 0.1 mm.

The starting material can be obtained as follows. 6 g. of sodium carbonate is added in portions to a solution of 30 g. of 4-phenyl-1-naphthaleneacetic acid in 300 ml. of methanol. After the addition is complete, the mixture is heated at reflux for 30 minutes and then evaporated under reduced pressure to give the solid sodium salt of 4-phenyl-1-naphthaleneacetic acid. With stirring, 28 g. of the acid chloride of 4-phenyl-1-naphthaleneacetic acid is added over a period of ten minutes to a mixture of 28.4 g. of the sodium salt of 4-phenyl-1-naphthaleneacetic acid in 300 ml. of dimethylformamide. The mixture is stirred for two more hours and evaporated to dryness under reduced pressure. The residue is extracted with benzene and the benzene solution is separated and evaporated to give the anhydride of 4-phenyl-1-naphthaleneacetic acid, suitable for use without further purification.

Example 23

A mixture of 14.4 g. of 2-dimethylaminoethyl chloride hydrochloride, 26.2 g. of 4-phenyl-1-naphthaleneacetic acid, 20.2 g. of triethylamine, and 100 ml. of N,N-dimethylformamide is heated at 85–90° C. for 19 hours and then cooled and diluted with ether. Insoluble triethylamine hydrochloride is removed by filtration and the filtrate is shaken with an excess of dilute hydrochloric acid. The organic phase is discarded and the acidic aqueous phase is made basic with sodium carbonate and extracted with ether. The ether solution is dried, filtered, and evaporated to dryness to give a residue of the 2-dimethylaminoethyl ester of 4-phenyl-1-naphthaleneacetic acid. The hydrochloride is obtained by dissolving the free base in ether and treating with one equivalent of hydrogen chloride.

Example 24

A mixture of 13.5 g. of 2-diethylaminoethyl chloride, 26.2 g. of 4-phenyl-1-naphthaleneacetic acid and 10.1 g. of triethylamine in 150 ml. of toluene is heated at 100° C. for 24 hours, cooled and diluted with ether. Insoluble triethylamine hydrochloride is removed by filtration and the filtrate is stirred with an excess of dilute hydrochloric acid. The organic phase is discarded and the acidic aqueous phase is made basic with potassium carbonate and extracted with ether. The ether extract is dried, filtered, and evaporated to dryness to give a residue of the 2-diethylaminoethyl ester of 4-phenyl-1-naphthaleneacetic acid. The citrate is obtained by treating a solution of the free base in methanol with a solution of citric acid in methanol.

By the foregoing procedure, with the substitution of 28.0 g. of 4-(m-fluorophenyl)-1-naphthaleneacetic acid for the 4-phenyl-1-naphthaleneacetic acid, the products obtained are the 2-diethylaminoethyl ester of 4-(m-fluorophenyl)-1-naphthaleneacetic acid and its citrate salt.

Example 25

A solution of 28 g. of the acid chloride of 4-phenyl-1-naphthaleneacetic acid and 13.1 g. of 3-diethylamino-1-propanol in 150 ml. of benzene is allowed to stand at room temperature for 18 hours. The mixture is diluted with ether, washed with 0.5 N sodium hydroxide and with saturated sodium chloride solution, dried and evaporated under reduced pressure to give a residue of the 3-diethylaminopropyl ester of 4-phenyl-1-naphthaleneacetic acid. The hydrochloride is obtained by dissolving the face in ether and treating it with one equivalent of hydrogen chloride.

Example 26

A solution of 6 g. of potassium hydroxide in 15 ml. of water is added to a solution of 6 g. of α-ethyl-4-phenyl-1-naphthylacetonitrile in 60 ml. of ethanol and the mixture is heated at reflux for 16 hours, concentrated to a small volume under reduced pressure, diluted with water, and filtered to remove insoluble α-ethyl-4-phenyl-1-naphthaleneacetamide formed as a by-product. The filtrate is washed twice with ether. The aqueous phase is acidified with dilute hydrochloric acid and the insoluble product is extracted with ether. The ether extract is washed with water, dried, and evaporated to give a residue of α-ethyl-4-phenyl-1-naphthaleneacetic acid; M.P. 143.5–144.5° C. following crystallizations from benzene-hexane and from aqueous ethanol. The same product is obtained by hydrolyzing the amide identified above as a by-product by heating it under reflux for 3 hours with dilute sulfuric acid-acetic acid, diluting with water, and collecting the product.

The starting material can be obtained as follows. A solution of 5 g. of 4-phenyl-1-naphthylacetonitrile in 15 ml. of dimethyl sulfoxide is added dropwise with stirring in a nitrogen atmosphere to a mixture of 1.05 g. of a 51.6% suspension of sodium hydride in mineral oil and 10 ml. of dimethyl sulfoxide. The mixture is stirred for 2 more hours and then, with external cooling to maintain the temperature below 30° C., 5.45 g. of ethyl bromide is added. After 3 more hours the mixture is hydrolyzed cautiously with dilute acetic acid and extracted with ether. The ether extract is washed with water, with saturated sodium bicarbonate solution, and with water, dried, and evaporated under reduced pressure to give a residue of α-ethyl-4-phenyl-1-naphthylacetonitrile as an oil.

Example 27

A solution of 6 g. of potassium hydroxide in 15 ml. of water is added a solution of 6 g. of α-propyl-4-phenyl-1-naphthylacetonitrile in 60 ml. of ethanol and the mixture is heated at reflux for 16 hours, concentrated to a small volume under reduced pressure, diluted with water, and washed twice with ether. The aqueous phase is acidified with dilute hydrochloric acid and the insoluble product is extracted with ether. The ether extract is washed with water, dried, and evaporated to give a residue of α-propyl-4-phenyl-1-naphthaleneacetic acid; M.P. 140–142° C. following crystallizations from aqueous ethanol.

The starting material can be obtained as follows. A solution of 5 g. of 4-phenyl-1-naphthylacetonitrile in 15 ml. of dimethyl sulfoxide is added dropwise with stirring in a nitrogen atmosphere to a mixture of 1.1 g. of a 51.6% suspension of sodium hydride in mineral oil and 10 ml. of dimethyl sulfoxide. After 4 more hours 5.84 g. of 1-bromopropane is added, with external cooling to maintain the temperature below 25° C. The mixture is stirred at room temperature for 16 hours, hydrolyzed cautiously with dilute acetic acid and extracted with ether. The ether extract is washed with water, with saturated sodium bicarbonate solution, and with water, dried, and evaporated to give a residue of α-propyl-4-phenyl-1-naphthylacetonitrile as an oil.

Example 28

A solution of 2.5 g. of α-butyl-4-phenyl-1-naphthaleneacetamide, 5 g. of sulfuric acid, 3.5 g. of acetic acid, and 3.3 ml. of water is heated at reflux for 3 hours and then poured into several times its volume of water. The insoluble product is separated and dissolved in ether. The ether solution is extracted with 5% potassium hydroxide solution. The aqueous phase is acidified with dilute hydrochloric acid and the insoluble product, α-butyl-4-phenyl-1-naphthaleneacetic acid, is collected; M.P. 133–133.5° C. following crystallizations from aqueous ethanol.

The starting material can be obtained as follows. A solution of 5 g. of 4-phenyl-1-naphthylacetonitrile in 15 ml. of dimethyl sulfoxide is added dropwise with stirring in a nitrogen atmosphere to a mixture of 1.1 g. of a 51.6% suspension of sodium hydride in mineral oil and 10 ml. of dimethyl sulfoxide. After 4 more hours 5.65 g. of 1-bromobutane is added dropwise with external cooling to maintain the temperature below 25° C. The mixture is stirred for 16 hours, hydrolyzed cautiously with dilute acetic acid, and extracted with ether. The ether extract is washed with water, with saturated sodium bicarbonate solution, and with water, dried, and evaporated to give a residue of α-butyl-4-phenyl-1-naphthylacetonitrile as an oil. A solution of 4.3 g. of this product in 50 ml. of ethanol is treated with a solution of 4.3 g. of potassium hydroxide in 15 ml. of water and the mixture heated at reflux for 16 hours, concentrated to a small volume under reduced pressure, diluted with water, and extracted twice with an ether-ethyl acetate mixture. The organic phase is separated, dried, and distilled under reduced pressure to leave a residue consisting primarily of α-butyl-4-phenyl-1-naphthaleneacetamide; M.P. 162.5–163.5° C. following several crystallizations from benzene-hexane. A quantity of the corresponding carboxylic acid, potassium salt, is also formed in this procedure.

I claim:
1. A compound of the formula

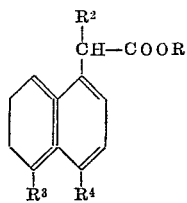

where R is a member of the class consisting of hydrogen, pharmaceutically-acceptable cations, lower alkyl, and lower dialkylaminoalkyl; $R^2$ is a member of the class consisting of hydrogen and lower alkyl; one of $R^3$ and $R^4$ is hydrogen; and the other of $R^3$ and $R^4$ represents where Z is a member of the class consisting of hydrogen, fluorine, chlorine, bromine, o-methyl, m-methyl, o-methoxy, and m-methoxy.
2. 4-phenyl-1-naphthaleneacetic acid.
3. 4-(m-chlorophenyl)-1-naphthaleneacetic acid.
4. 4-(o-chlorophenyl)-1-naphthaleneacetic acid.
5. 4-(m-fluorophenyl)-1-naphthaleneacetic acid.
6. 5-phenyl-1-naphthaleneacetic acid.
7. 5-(m-fluorophenyl)-1-naphthaleneacetic acid.

References Cited

Chem. Abstracts, Newman, vol. 33, 1315[8] (1939).
Chem. Abstracts, Ansell et al., vol. 55, 13400d (1961).
Chem. Abstracts, Newman (II), vol. 34, 3729 (1940).

LORRAINE A. WEINBERGER, Primary Examiner

M. G. BERGER, Assistant Examiner

U.S. Cl. X.R.

260—465, 469, 473, 501.1, 501.15, 501.16, 501.17, 520, 544, 558, 559, 564, 566, 590, 612, 649, 999